United States Patent [19]

Nagamine

[11] Patent Number: 5,228,867
[45] Date of Patent: Jul. 20, 1993

[54] ELECTRICAL CONNECTOR BOLT FASTENING DEVICE

[75] Inventor: Akira Nagamine, Kawasaki, Japan

[73] Assignee: The Whitaker Corporation, Wilmington, Del.

[21] Appl. No.: 970,349

[22] Filed: Nov. 2, 1992

[30] Foreign Application Priority Data

Dec. 6, 1991 [JP] Japan .............................. 3-108519[U]
Apr. 20, 1992 [JP] Japan .............................. 4-032702[U]

[51] Int. Cl.⁵ .......................................... H01R 13/127
[52] U.S. Cl. ................................... 439/364; 439/489; 411/8; 403/27
[58] Field of Search ............... 439/359, 365, 488, 489; 411/8, 14; 403/27, 343

[56] References Cited

U.S. PATENT DOCUMENTS

| | | | |
|---|---|---|---|
| 3,732,525 | 5/1973 | Henschen et al. | 439/364 |
| 4,629,351 | 12/1986 | Kato et al. | 439/488 |
| 4,850,896 | 7/1989 | Smith et al. | 439/362 |
| 4,957,449 | 9/1990 | Hatagishi | 439/364 |
| 5,139,431 | 8/1992 | Saitoh et al. | 439/364 |

FOREIGN PATENT DOCUMENTS 62-188188 2/1986 Japan.

*Primary Examiner*—Larry I. Schwartz
*Assistant Examiner*—Hien D. Vu
*Attorney, Agent, or Firm*—Adrian J. LaRue; Timothy J. Aberle

[57] ABSTRACT

A connector half (2) includes a housing (10) and a bolt fastener (50) having a neck (56) adapted to receive a plate fastener (70) inserted transversely to the bolt through a slot (20) in the connector housing to lock the bolt to the housing. Various embodiments of the plate fastener (70), (70'), and (70'') are included, and in one embodiment, the bolt is made to include a neck (54) adapted to receive projections (38) interiorly of a bore (36) in the housing to hold the bolt in position prior to insertion of the fastener plate.

11 Claims, 3 Drawing Sheets

ELECTRICAL CONNECTOR BOLT FASTENING DEVICE

This invention relates to an electrical connector bolt fastening device for interconnecting connector halves.

BACKGROUND OF THE INVENTION

As the electronics used in vehicles becomes more sophisticated and complex, connectors used with electronic devices require more and more contacts. The increase in number of contacts in turn requires a greater axial force between connector halves during mating. For this reason, fasteners in the form of a bolt, typically threaded in a standard manner, and a nut receiving such bolt, are used to effect an interconnection and disconnection of connector housings. The bolt is typically incorporated in one connector housing and the nut in the other. The housings are pulled together by turning the bolt with the bolt threading into the nut. Japanese Utility Model 60-876 shows an application of bolt and nut fasteners in an electrical connector. Japanese Patent 62-188188 shows a further application of a bolt fastened connector which allows the bolt-retaining portion of the connector to be separately made and added to the connector after contact insertion is completed. A continuing problem with existing bolt fastened connectors includes the possibility of threads being stripped or bolts being sheared, and with the nut portion of the fastener buried within the connector housing, removal for replacement can be difficult and time consuming.

Accordingly, the present invention has as a principal object the provision of a bolt operated fastener for an electrical connector that allows the bolt fastener to be removed in the event of damage without operation of the bolt. It is a still further object to provide a simple and inexpensive connector bolt fastener that is readily replaceable in the connector. It is a still further object of the invention to provide an electrical connector having a bolt-nut fastener incorporated into one-half of a connector and readily removable from the connector half without unmating the connector halves.

SUMMARY OF THE INVENTION

In accordance with the present invention, a connector half includes a plastic housing having front and rear faces with cavities extending between such faces aligned to receive contacts terminated to wires or other terminals fitted within such cavities. The cavities lie along an axis parallel to the mating axis of the connector half with a further connector. The housing further includes a central bore extending between the faces parallel to the mating axis with a bolt fastener adapted to fit within such bore. The bolt fastener includes a head of a diameter larger than the bore and a shank that ends in a threading adapted to engage a nut in a mating connector half with a bolt being turned to draw the two halves together and effect an interconnection of the contacts of both halves. In accordance with the invention, the housing is made to include a slot which transects the bore of the housing and is of a dimension to receive a flat blade-like fastener inserted therein. The fastener has, in one embodiment, a slot of a dimension to mate with a reduced neck in the bolt aligned with the slot and to lock the bolt against displacement from the housing while allowing the bolt to be turned to effect the drawing together of the two connector halves. In another embodiment, the plate-like fastener includes an aperture having two diameters, one to allow a ready insertion of the bolt through the fastener and the other to fit within the neck portion of the bolt and lock the bolt against axial displacement relative to the housing. Still another embodiment of the invention includes a recess or relief within the housing proximate to the forward face of the housing positioned to be engaged by a dimple that latches the plate-like fastener within the slot of the housing.

In the several embodiments of the plate-like fastener, a turned up end is provided to facilitate removal of the plate-like fastener from the housing.

DETAILED DESCRIPTION OF THE INVENTION

Figure 1:
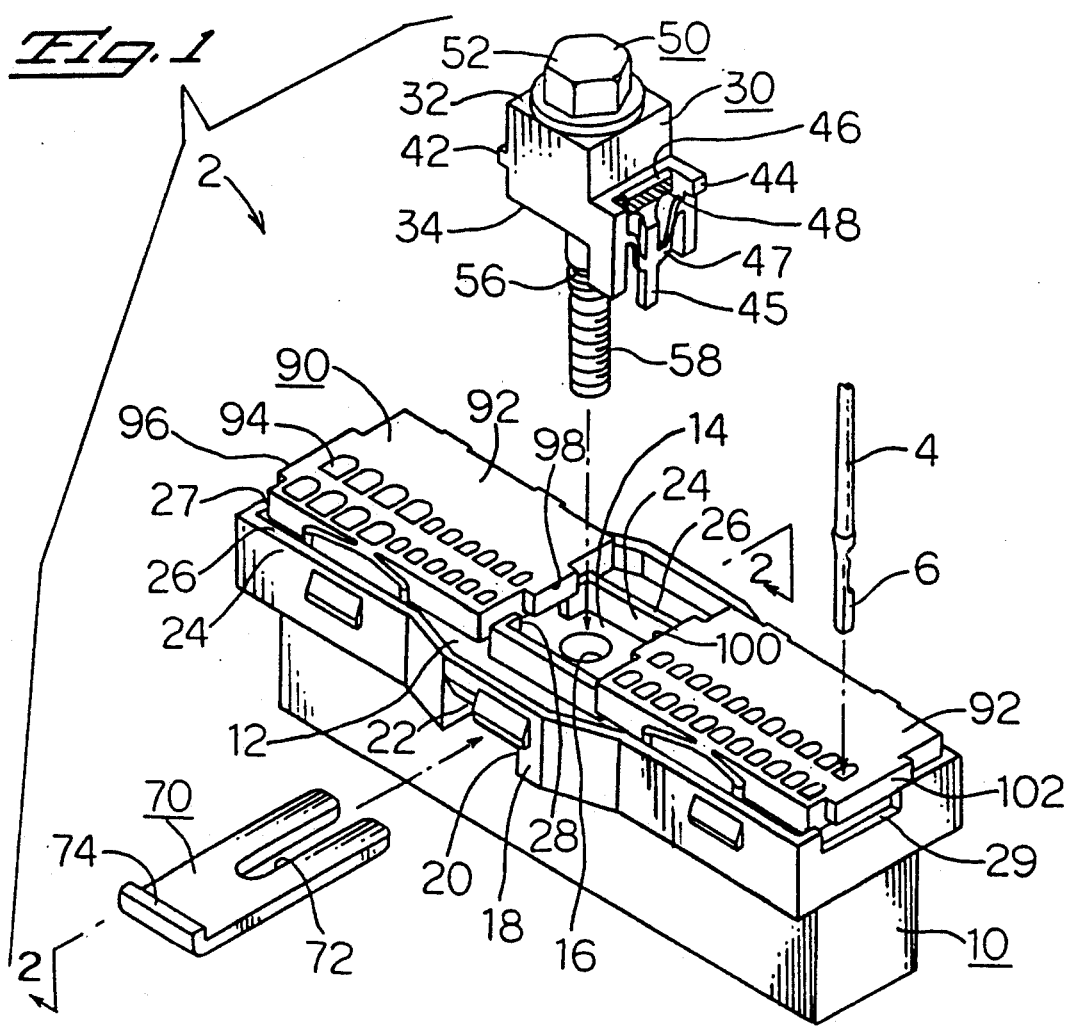
FIG. 1 is a perspective view showing a connector housing, a contact, a bolt fastener and a plate fastener removed from the housing according to the present invention.

FIG. 1 shows an electrical connector half 2 with a bolt-retaining housing 30, a bolt 50, and a plate-like fastener 70. The connector 2 has a connector housing 10 that is configured to receive the bolt-retaining housing 30. Bolt 50 is secured in the bolt-retaining housing in a position to engage a nut (not shown) in a mating connector that mates with the connector half of FIG. 2. The two connector halves fit together, and rotation of the bolt, which has threads on the end thereof, engages the nut and operates to draw the connector halves together, mating the contacts of the connector half 2 and the mating half, not shown, despite considerable axial forces required for mating arrays of multiple contacts. The connector half housing 10 includes a rear face 12 having multiple cavities adapted to receive contacts 6 to which wires are terminated. In the center of surface 12 there is a relieved area 14 adapted to receive bolt-retaining housing 30, and approximately in the center of this surface is an bore 16 adapted to receive bolt 50. In a side surface 18 of connector housing 10 is an opening 20 which leads to a slot extending through the housing adapted to receive plate-like fastener 70 that intersects the aperture or bore 16 through which bolt 50 is extended.

Figure 2:
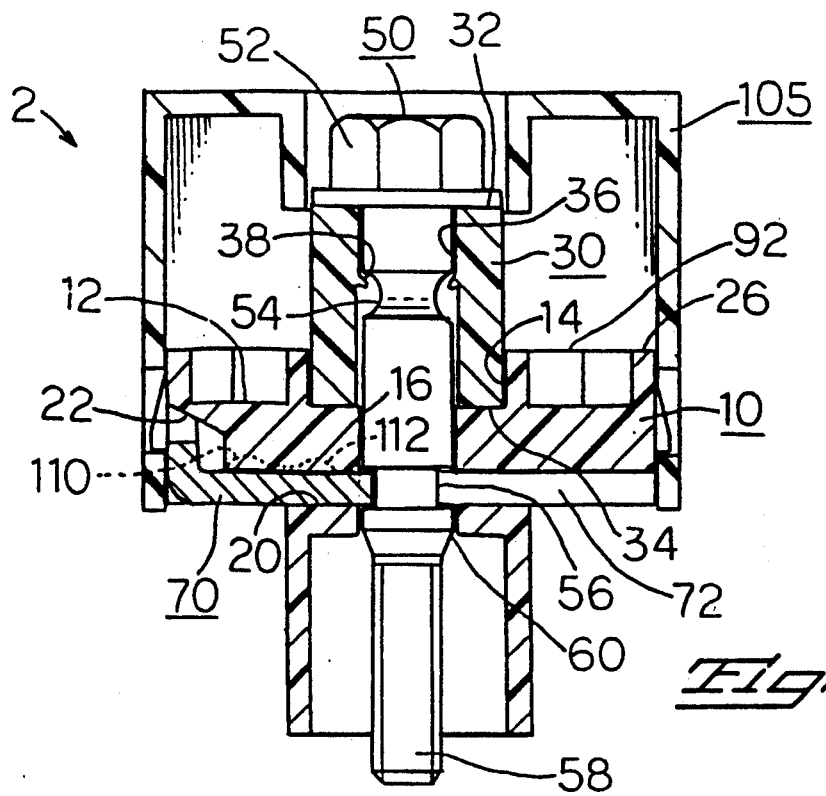
FIG. 2 is a side, elevational, and sectional view taken through lines 2—2 of FIG. 1 with a housing cover shown on the connector.

One end 32 of the bolt-retaining housing 30 is configured to receive the bolt head 52, and the other end 34 is configured to fit within the relief 14 of housing 10. In the center of housing 30 is an bore 36, as shown in FIG. 2, that forms part of the bore 16. The bore 36 is made to contain projections 38 that operate to hold bolt 50 in place through the engagement by such projections in a first neck 54 made in the shank of bolt 50. Referring back to FIG. 1, the bolt-retaining housing may be seen to include a rod 45 having an end surface that contacts the rear surface of connector half 2, specifically surfaces 92 of plates 90. An integral hinge 46 connects the upper part of rod 45 and housing 30, and a pair of springs 47 connect the sides of rod 45 with housing 30. A colored tag 48 shown in FIG. 1 as the hatched area, is of the same thickness as hinge 46 located between rod 45 and hinge 46. When the connector half 2 is not attached to a mated connector, no pressure is applied to the bottom surface of rod 45, and the colored tag 48 faces sideways as shown in FIG. 1. When the attachment of connector half 2 to a mating connector half is completed, rod 45 is pushed by the mating connector half and the colored tag turns up. This forms a signal to an assembly worker that the assembly is completed. When the connector halves are disconnected, springs 47 move rod 45 down, and the colored tag 48 turns again to the side and becomes less readily visible.

As can be seen in FIG. 2, bolt 30 is inserted in the bolt-retaining housing 30 so that the first neck 54 of the bolt shank is positioned as shown, and a second neck 56, displaced axially from the first neck, is positioned with its surfaces proximate the forward face of the connector with respect to the mating surfaces. As can be discerned, the head 52 has a diameter substantially larger than bore 36, and the necks 54 and 56 have diameters substantially less than the diameter of the shank of the bolt. Extending from the bottom of the bolt is a threaded portion 58 that mates with a nut in a connector half, not shown, for the purposes described. Between the main body of the shank is a taper 60 shown in FIG. 2 that facilitates an easy insertion of the bolt into the connector half. The outer diameter of neck 54 is chosen to have a thickness such that an overtightening of the bolt will shear the bolt at neck 54. For reasons that will become apparent, the connector halves can be readily removed by removing the fastener in such event to allow a displacement of the connector halves apart while the bolt is still threaded into the nut of the mating connector half.

Figure 3:
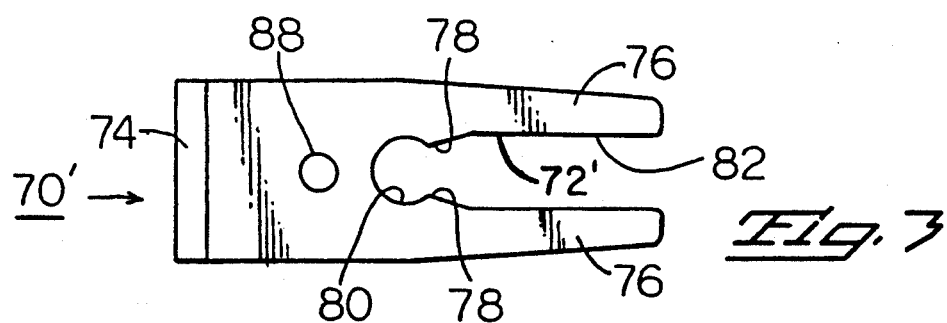
FIG. 3 is a plan view of an alternative plate-fastener for use in the connector of FIG. 1.
Figure 4:
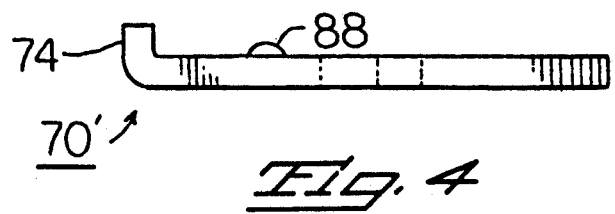
FIG. 4 is a side view of the fastener shown in FIG. 3.

FIG. 1 shows a plate-like fastener 70 to include a slot 72 and an upturned lip 74, the fastener 70 also being shown in FIG. 2 inserted into a slot in the connector half housing. The fastener 70 is typically made from a sheet metal material of specific thickness, stamped and formed to the configuration shown in Figure or in the alternative embodiment shown in FIGS. 3-6. As shown in FIG. 2, the connector housing half 10 may include a pair of recesses 110 and 112 internally lined up with the slot 20 that extends through the housing. These recesses can be utilized to accommodate projections or bumps on the fastener FIG. 3 shows a fastener 70' having a bump 88 on the upper surface thereof adapted to engage the recesses 110 or 112. The fastener 70' also includes an slot 72, with a turned up end 74 and legs 76 defining a first slot portion 82 leading through a tapered portion 78 to a central aperture 80 of a diameter to fit within neck 56 and retain bolt 50. The fastener 70, can be withdrawn to a point where the bump 88 engages recess 110 aligning the enlarged portion of slot 72, with the bolt to allow the fastener 70' to be retained by the connector half while the bolt 50 is inserted or withdrawn. FIG. 4 shows fastener 70, in side view and the profile of bump 88. With the fastener fully inserted, bump 88 will engage recess 112 and latch the fastener against accidental displacement. Also to be noted in FIG. 2 is the beveled surface 22 into which a screwdriver may be inserted to pry fastener 70 or 70, out of slot 20 and remove it from the connector half. The upturned portion 74 of fastener 70 or 70' also serves to limit the insertion of the fastener into the slot 20 and connector half.

Figure 5:
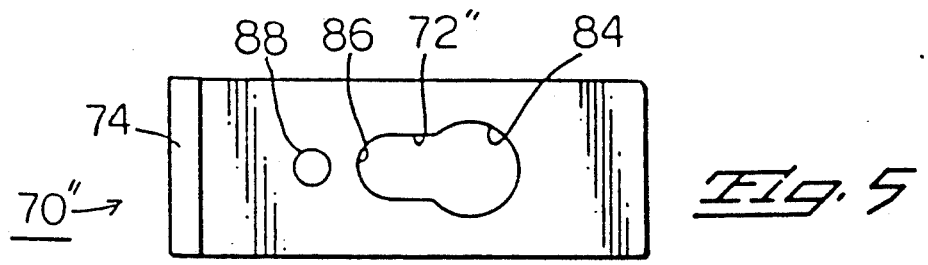
FIG. 5 is a plan view of a plate-fastener of a second embodiment of the instant invention.
Figure 6:
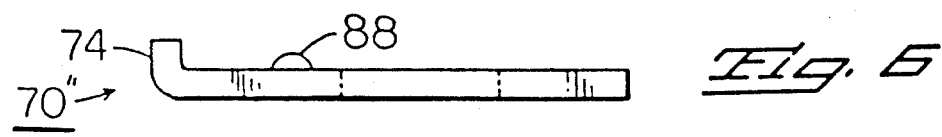
FIG. 6 is a side view of the fastener of FIG. 5.

FIG. 5 shows a plate-like fastener 70", including the features before, turned up portion 74 and slot 72' that is defined by an aperture and includes an enlarged diameter portion 84 and a reduced diameter portion 86, bump 88 can be seen in both FIGS. 5 and 6 with respect to fastener plate 70".

As can be seen from FIG. 1, the connector half 2 includes plates 90, a pair of plates positioned on the rear face of the connector housing 10. Plates 90 have contact-receiving openings 94 that align with the openings on surface 12 of the connector. At both ends of the plates 90 are projections 96, 98, 100, and 102. At the side surfaces of housing 30 are lugs 42 and 44, as can be seen in FIG. 1, that engage the projections 98 and 100. Plates 90 can move relative to housing 10 between a temporary position enabling the insertion of contacts 6 and a locking position to which the plates are moved after insertion of contacts 6. In the locking position the projections 96,102 are moved into the notches 27,29, respectively, as the bolt 50 is tightened. In the temporary position, a surface 92 of plate 90 is offset from the edge 26 of partition 24. When the plates are moved into the locking position, they become level with the edge 26 of partition 24. If a contact 6 is not completely inserted in the contact-receiving opening, plates 90 cannot be moved into the locking position, because a part of contact 6 will protrude from the contact-receiving opening 94. At this time, protrusions 42 or 44 of retaining housing 30 come into contact with projections 98 or 100 of the double locking plates 90, and the bolt-retaining housing 30 cannot be inserted to the required depth in recess 14. As a result, plate 70 cannot be inserted into the receiving slot 20 since its position does not correspond to the second neck of bolt 50. Therefore, the metal fastening plate cannot be moved into the proper position, signaling an improper contact insertion.

Following insertion of contacts 6 with attached wires 4 into the appropriate openings 94 of the plates of the connector housing, the bolt-retaining housing 30 with bolt 50 inserted into the opening 36 is positioned as is shown in FIG. 2. Next, plate 70 is inserted in slot 20 with the neck 56 fitting in groove 72 to fasten the bolt and housing to the connector housing 10. Wires 4 are arranged in one of two directions and are inserted in a cable cover 105, the edge of cable cover 105 can be extended so that it blocks the movements of plate 70 as shown in FIG. 2.

Figure 7:
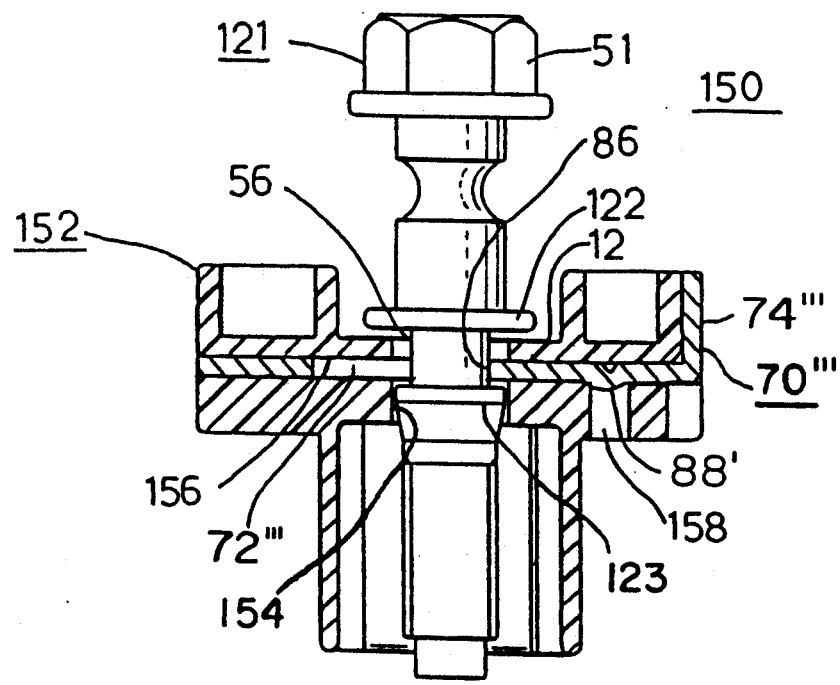
FIG. 7 is a side, elevational, and partially sectioned view of a portion of a connector and a fastener in accordance with the second embodiment of the invention.

FIG. 7 shows another embodiment of a connector 150. The device shown in FIG. 7 does not have a bolt-retaining housing 30 as shown in FIG. 1, but consists of a bolt 121 and fastening plate 70", similar to the plate shown in FIGS. 5 and 6 that engages bolt 121. The difference between bolt 121 and bolt 50 is that the neck 56 is adjacent flange 122 of the bolt so that when the bolt is inserted in an opening 154 of housing 152, the bottom surface of flange 122 stops at surface 12. A flange 123 increases the diameter of bolt 121 so that neck 56 is formed between flanges 123 and 122. Thereafter, plate 70", is inserted into a slot 156 provided in the housing 152 and is pushed in to engage the bolt 121 at neck 56 as shown in FIG. 7. The housing includes an aperture 158 that engages the bump 88' and the plate includes an end 74", allowing manipulation of the plate into an outer position of the housing. In the embodiment shown in FIG. 7, there is no need for a housing 30 as in FIG. 2 since flange 122 retains bolt 121 against surface 12.

The foregoing preferred embodiments as described provide a rugged and durable structure that is easily disassembled by disengaging the plate fastener from the bolt neck.

Having now described the invention intended to enable a preferred practice in its several modes, claims are set forth intended to define what is inventive.

I claim:

1. An electrical connector of a type having a bolt operable to draw and hold connector halves together to interconnect electrical circuits, said connector having a housing including a forward mating face and a rear face with arrays of cavities extending therebetween, a bore formed in said housing having a given diameter in a portion of said housing proximate said rear face and a lesser diameter extending from said rear face to the forward face, a bolt having a head of a diameter larger than the given diameter of said bore and a shank of a diameter smaller than the lesser diameter of said bore, said shank including a neck of a diameter less than that of said shank diameter located proximate said forward mating face in said housing, a slot in said housing essentially transecting said bore, said slot having an opening on the outside of said housing, plate fastener of a dimension to slidingly fit in said slot, said fastener having surfaces positioned and dimensioned to engage said neck of said shank upon insertion of said fastener through said opening of said slot in a direction normal to said and lock said bolt to said housing, and means to latch said fastener in said slot and to said housing.

2. The connector of claim 1 wherein said surfaces are defined by a slot extending from one end of the fastener toward the center thereof.

3. The connector of claim 1 wherein said surfaces are defined by an aperture in said fastener having different width dimensions with respect to the said neck to facilitate insertion of the bolt through the fastener and displacement of the fastener transversely to effect said locking of the bolt to the connector.

4. The connector of claim 1 wherein said means is comprised of a bump in the fastener and a relief in the housing.

5. The connector of claim 1 wherein said fastener includes a turned up end and the housing includes a relief to receive said end entirely within said housing.

6. The connector of claim 1 wherein said shank includes a further reduced diameter portion and said housing includes means to engage said portion to latch said bolt in said housing prior to insertion of said fastener.

7. The connector of claim 6 wherein said reduced diameter of said shank is of a dimension to provide a shearing of said bolt at said portion in the presence of overstressing of said bolt to preclude stripping of said bolt threads.

8. The connector of claim 1 wherein said bolt is disposed in a bolt-retaining housing having lug means disposed thereon.

9. An electrical connector of a type having a bolt for drawing connector halves together to interconnect electrical circuits, comprising:

a housing with a bore, a slot transverse to said bore, and a plurality of electrical contact-receiving cavities;

a frangible bolt having an engaging portion disposed in said housing bore;

fastening plate means disposed in said slot adjacent said bolt engaging portion operable from a first, engaging position to a second, disengaging position;

whereby moving the fastening means to the disengaged position provides separation of the bolt from the housing.

10. An electrical connector of claim 9, wherein said fastening plate means includes a slot.

11. An electrical connector of claim 9, wherein said fastening plate means includes an aperture.

* * * * *